United States Patent [19]

Kanbayashi et al.

[11] Patent Number: 5,745,814
[45] Date of Patent: Apr. 28, 1998

[54] CAMERA LENS SHUTTER UNIT HAVING A STRUCTURE WHICH REDUCES THE SHUTTER UNIT THICKNESS

[75] Inventors: Hideki Kanbayashi, Kawasaki; Kenji Tazaki, Mito; Masanori Hasuda, Yokohama, all of Japan

[73] Assignee: Nikon Corporation, Tokyo, Japan

[21] Appl. No.: 654,749

[22] Filed: May 29, 1996

[30] Foreign Application Priority Data

May 29, 1995 [JP] Japan .................................. 7-153893
Jun. 23, 1995 [JP] Japan .................................. 7-180982

[51] Int. Cl.$^6$ ............................................ G03B 9/08
[52] U.S. Cl. ................................................. 396/460
[58] Field of Search ............................ 354/228, 229, 354/230, 231, 232, 270, 271.1, 272, 273, 274; 396/458, 460, 463, 493, 497, 500, 501

[56] References Cited

U.S. PATENT DOCUMENTS 4,227,792  10/1980  Rentschler .................... 354/230

Primary Examiner—Howard B. Blankenship

[57] ABSTRACT

A camera lens shutter having separate aperture blades and shutter blades arranged in a manner to provide a shutter unit having decreased thickness. The lens shutter includes a first shading member to expose an exposure aperture when in an open state and to cover the exposure aperture when in a closed state. A first circular cam drives the primary shading member. A second shading member forms a plurality of aperture diameters, and a second circular cam drives the second shading member. The inner diameter of either the first or second cam is made larger than the outer diameter of the other. The lens shutter may also include a shading member to expose an exposure aperture wherein an open state, a first circular cam to drive the first shading member, a second shading member to cover or close the exposure aperture, a second circular cam to drive the second shading member, a third shading member to form a plurality of aperture diameters, and a third circular cam to drive the third shading member. The respective cams of the shutter units are positioned concentrically and may be on approximately the same plane to provide a thinner shutter unit.

22 Claims, 9 Drawing Sheets

CAMERA LENS SHUTTER UNIT HAVING A STRUCTURE WHICH REDUCES THE SHUTTER UNIT THICKNESS

BACKGROUND OF THE INVENTION

1. Field of the Invention

The present invention relates to a camera having a shutter unit and, more particularly, the present invention relates to a camera having a lens shutter unit including separate shutter blades and aperture blades arranged in a manner which decreases the thickness of the shutter unit.

2. Description of the Related Art

Compact cameras typically include a lens shutter having blades which serve as both shutter blades and aperture blades. However, lens shutters are known which have separate shutter dedicated blades and aperture dedicated blades. The benefit of these types of shutters having separate blades dedicated respectively to the shutter function and to the aperture function is that the shape of the aperture can be made into a nearly circular shape using the separate aperture dedicated blades, thereby making it possible to take photographs designed to have a more natural out of focus effect. The aperture dedicated blades are generally constructed using circular cam members in a manner which makes it possible to form an aperture surface area of any desired size.

Recently, focal plane shutters have been used in single lens reflex cameras. The focal plane shutters used in single lens reflex cameras clearly outperform the lens shutters used in compact cameras with respect to maximum exposure speed. Accordingly, improvement in the maximum exposure speed of a lens shutter is desirable since increasing the maximum exposure speed also allows a photographer to expand his or her photographic domain.

In order to increase the maximum exposure speed of the lens shutter, it is necessary to make the shutter blades move more quickly. Several methods can be used to make the shutter blades move more quickly. A first method is to increase the output from an actuator which is used to drive the shutter blades. A second method by which the shutter blades can be made to move more quickly is to reduce the weight of the shutter blades. A third method to make the shutter blades move more quickly is to provide separate shutter blades for exposure starting (hereinafter referred to as "opening blades") and for exposure stopping (hereinafter referred to as "closing blades").

With respect to the first method, in order to increase the output from an actuator used to drive the shutter blades, a physically larger motor is required. However, a motor with a significantly larger output cannot be installed without increasing the size of the shutter unit, and because of the desirability of reducing the size of shutter units, installing a larger motor is impractical.

Further, with respect to the second method of making the shutter blades move more quickly, although reducing the weight of the shutter blades is an effective method of achieving high-speed exposure, the weight of the shutter blades is not the most important factor in achieving high-speed exposure. Specifically, in the lens shutter, power is more frequently transmitted to the shutter blades by rotation than by translation. Thus, the shutter blades are opened and closed by rotation. Consequently, the moment of inertia around the rotational center of the shutter blades is a more important factor in moving the shutter blades more quickly than the mass of the shutter blades. Therefore, for example, to reduce the moment of inertia per each blade, instead of covering the exposure aperture with two shutter blades, the overall amount of energy necessary to drive the shutter blades can be decreased by increasing the number of blades while decreasing the size of each blade. It is common to drive the blades of a shutter having the above-described configuration with a circular cam member in order to simultaneously drive each of the more than two shutter blades.

Still further, with respect to the third method of increasing shutter speed, it is possible to increase the maximum exposure speed by using separate shutter blades for exposure starting (opening blades) and exposure stopping (closing blades). In operation of lens shutters which have dual-purpose opening and closing shutter blades, the shutter blades which have been moved in the open direction must be stopped, and then moved in the reverse direction, thereby resulting in a time loss. However, if the opening blades and the closing blades are provided separately, it is possible for the closing blades to be moving in the closed direction by the time the opening blades are completely retracted from the exposure aperture, and therefore high speed exposure time is achievable.

SUMMARY OF THE INVENTION

It is an object of the present invention to provide a shutter unit including separate shutter blades and aperture blades arranged in a manner which decreases the thickness of the shutter unit in comparison to conventional shutter units.

It is another object of the present invention to provide shutter unit including aperture blades, shutter dedicated opening blades and shutter dedicated closing blades which are separate members arranged in a manner which decreases the thickness of the shutter unit in comparison to conventional shutter units.

Additional objects and advantages of the invention will be set forth in part in the description which follows, and, in part, will be obvious from the description, or may be learned by practice of the invention.

Objects and advantages of the present invention are achieved in accordance with a first and a second embodiment of the present invention with a lens shutter unit including a first shading member to expose an exposure aperture when in an open state and to cover the exposure aperture when in a closed state; a first circular cam to drive the first shading member; a second shading member to form a plurality of aperture opening diameters when the exposure aperture is in an open state; and a second circular cam to drive the second shading member, wherein the first circular cam and the second circular cam are arranged concentrically, and art inner diameter of either the first cam or the second cam is larger than an outer diameter of the other cam. Further, the first cam and the second cam may be on approximately the same plane.

In accordance with the lens shutter of the first embodiment, the respective diameters of the first circular cam which drives the first shading member, and the second circular cam which drives the second shading member, are such that the inner diameter for one of the cams is larger than the outer diameter of the other cam, making it possible to achieve a thinner shutter unit.

Objects and advantages of the present invention are achieved in accordance with a third embodiment of the present invention with a lens shutter device which performs an exposure operation based on start instructions and stop instructions, including a first shading member to expose an exposure aperture in response to a start instruction which places the first shading member in an open status; a first circular cam to drive the first shading member; a second shading member to cover the exposure aperture in response to a stop instruction which places the second shading member in a closed status; a second circular cam to drive the second shading member; a third shading member to form a plurality of aperture opening diameters; and a third circular cam to drive the third shading member.

In accordance with the lens shutter of the third embodiment of the invention, the first shading member comprises shutter opening blades, the second shading member comprises shutter closing blades, and the third shading member comprises aperture blades which are driven by the first circular cam, second circular cam, and third circular cam, respectively. The first, second and third circular cams are arranged concentrically to provide a shutter unit with reduced thickness. Further, the first, second and third circular cam may be on approximately the same plane.

BRIEF DESCRIPTION OF THE DRAWINGS

These and other objects and advantages of the invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
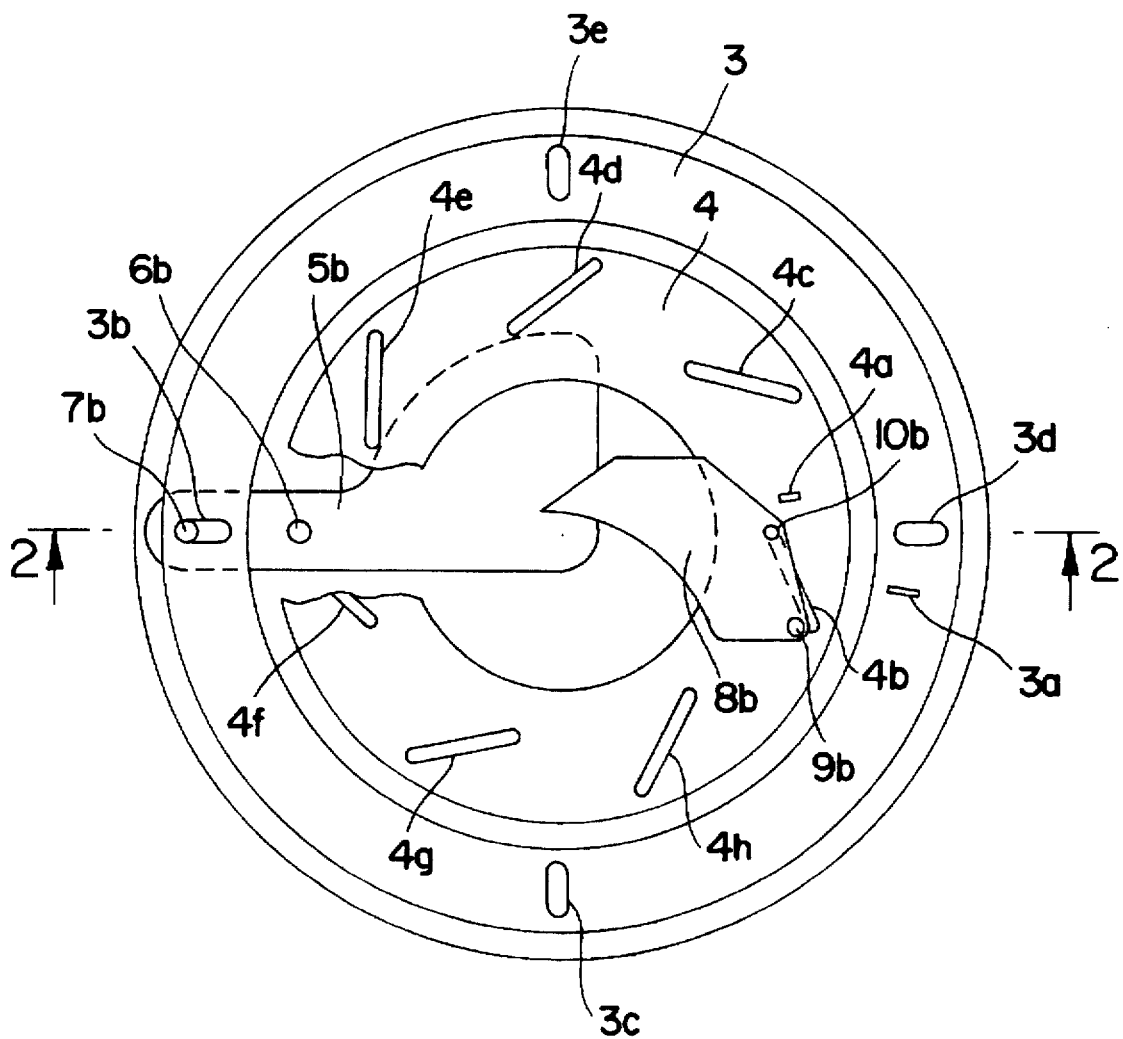
FIG. 1 is a top plane view of a lens shutter in accordance with a first embodiment of the present invention.

Reference will now be made in detail to the preferred embodiments of the present invention, examples of which are illustrated in the accompanying drawings wherein like reference numerals refer to the same or similar elements throughout.

A lens shutter, e.g., suitable for a camera, in accordance with a first embodiment of the present invention will be described below with reference to FIGS. 1–4. FIGS. 1–4 show a top plane view, a cross-sectional side view, a top plane view, and a perspective view, respectively, of the lens shutter.

Figure 2:
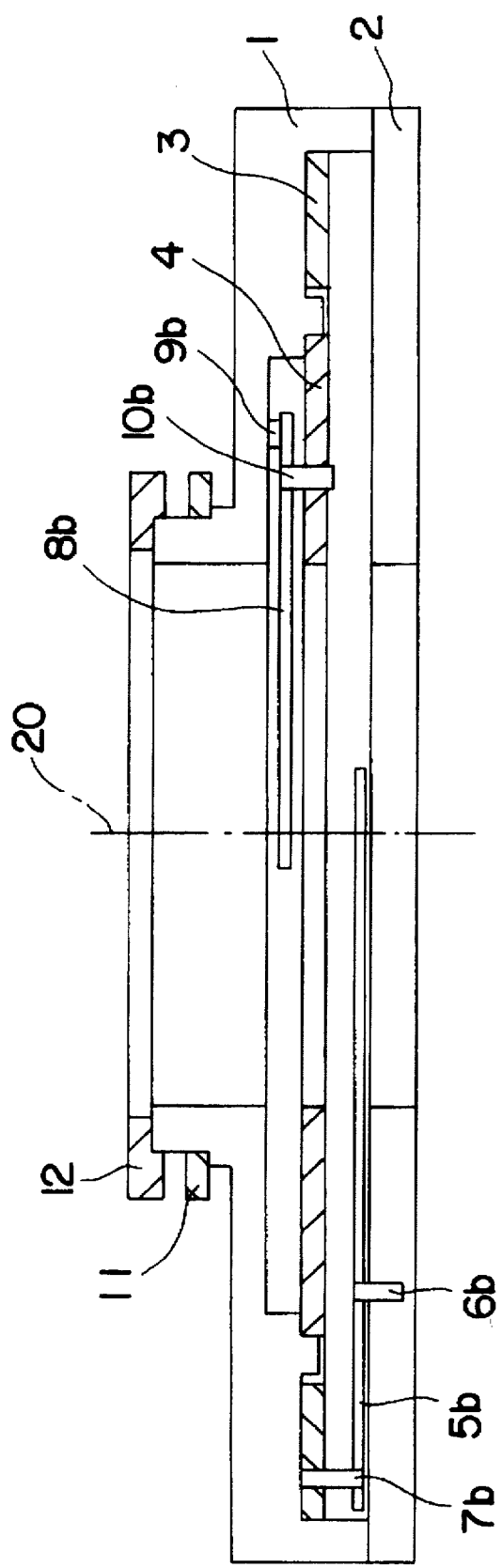
FIG. 2 is a cross-sectional view of the lens shutter in accordance with the first embodiment of the present invention.
Figure 3:
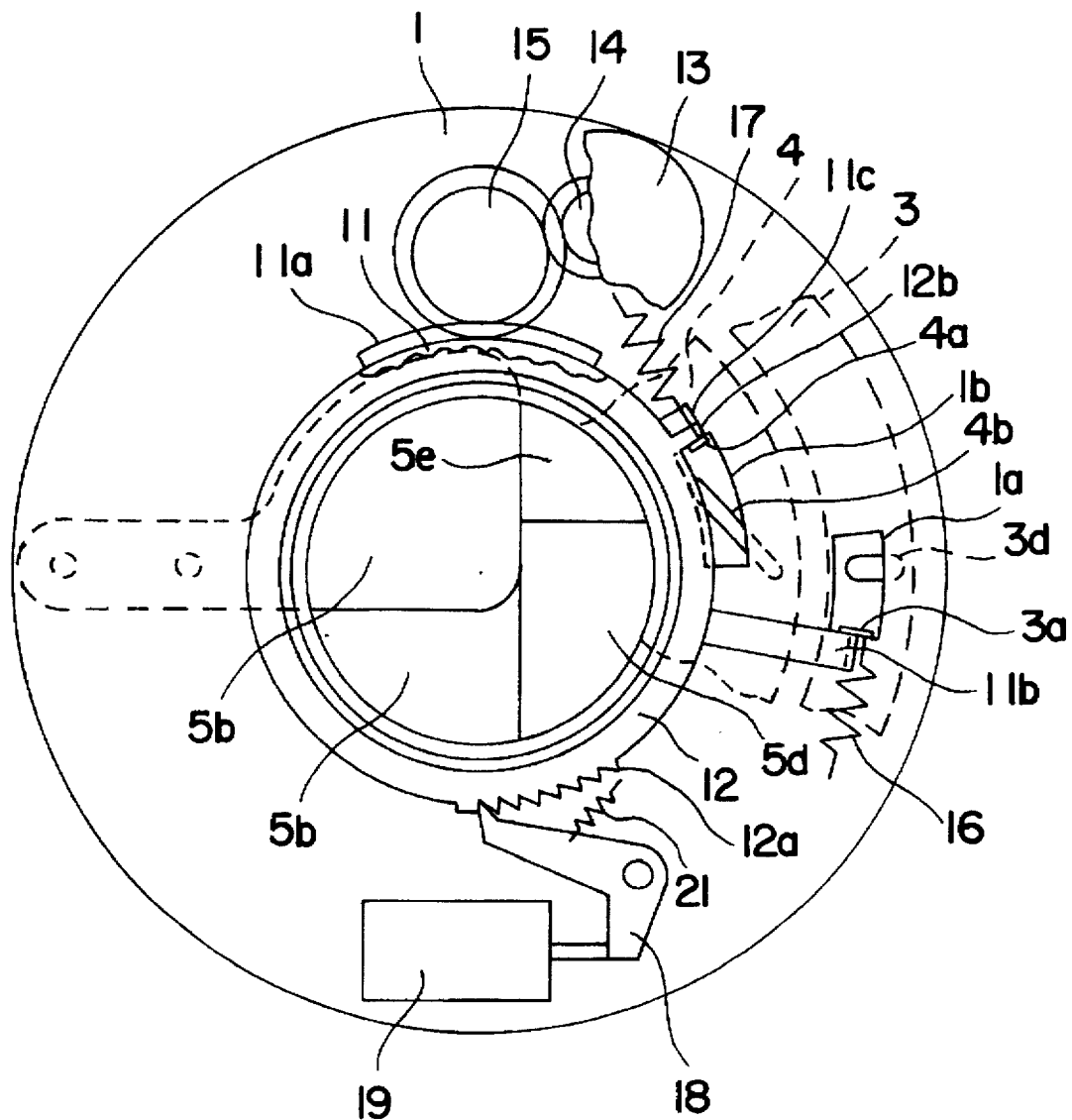
FIG. 3 is a top plane view of the lens shutter in accordance with the first embodiment of the present invention.
Figure 4:
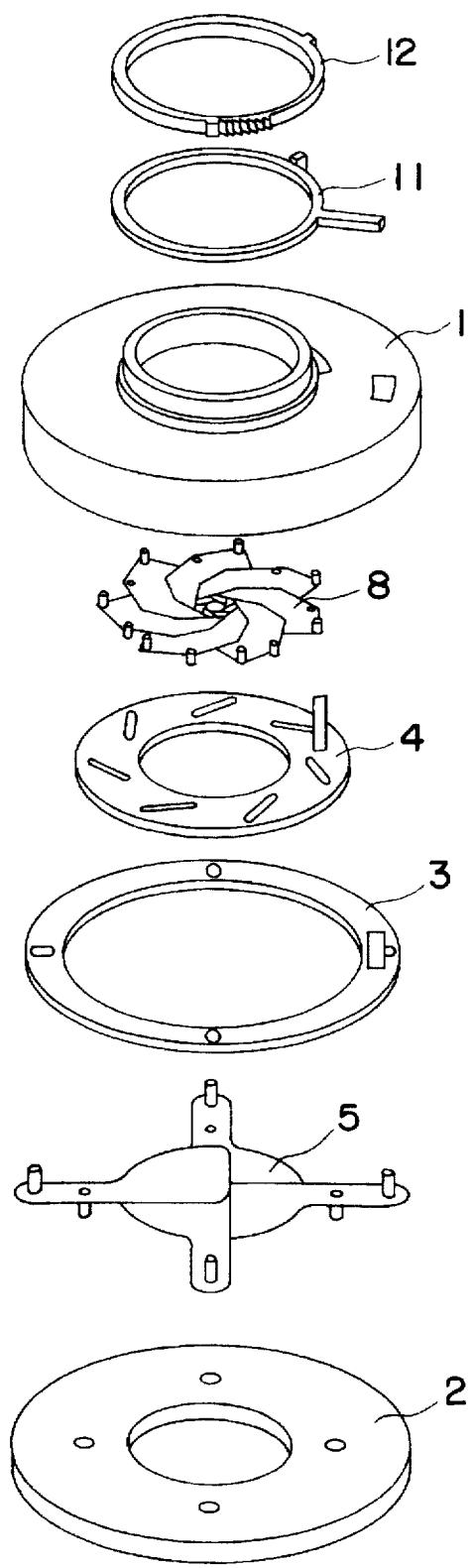
FIG. 4 is an exploded perspective view of the lens shutter in accordance with the first embodiment of the present invention.

As shown in FIGS. 2 and 4, the lens shutter in accordance with the first embodiment of the present invention includes a shutter 5, an aperture 8, a shutter cam ring 3, and an aperture cam ring 4 positioned between a circular upper plate 1 and a lower plate 2. A drive mechanism system comprising a drive ring 11, an aperture ring 12, and other elements which will be described in detail with reference to FIG. 3, is positioned on top of the upper plate 1. FIG. 1 is a top plane view of the lens shutter shown in FIG. 2, without the upper plate 1 and the drive mechanism system on top of the upper plate 1. FIG. 2 is a cross-sectional view of the lens shutter shown in FIG. 1 taken along the line 2—2 in FIG. 1. However, the drive mechanism system on top of the upper plate 1 is omitted from FIG. 2, except for the drive ring 11 and the aperture ring 12.

The lens shutter in accordance with embodiments of the present invention includes a total of four (4) shutter blades 5b, 5c, 5d and 5e. Although only shutter blade 5b is shown in FIG. 1 in order to simplify the figure, each of the shutter blades 5b–5e operate in the same manner. The four (4) shutter blades 5b–5e are positioned at points separated by 90° around the optical axis 20 (see FIG. 4). Referring to the shutter blade 5b as representative of the other shutter blades 5c–5e, a dowel 6b is affixed to the shutter blade 5b, and the dowel 6b is fitted with the lower plate 2 in a manner that allows the shutter blade 5b to rotate freely. Further, a dowel 7b is affixed to the left edge of the shutter blade 5b, and the dowel 7b is fit in a cam hole 3b of a shutter blade cam ring 3 (FIGS. 1 and 2). Furthermore, as shown in FIG. 2, the shutter blade 5b and the shutter blades 5c–5e (not shown in the figure) are positioned between the shutter blade cam ring 3 and the lower plate 2 at different heights in the direction of optical axis 20 so that the shutter blades 5b through 5e do not interfere with each other when in operation.

The shutter blade cam ring 3 is fitted with the upper plate 1 so that rotation of the shutter blade cam ring 3 is possible. As shown in FIGS. 1 and 3, a protrusion 3a is provided on the shutter blade cam ring 3 which passes through a hole 1a in the upper plate 1 and reaches the drive mechanism system on top of the upper plate 1. Elongated cam holes 3b–3e are provided in the shutter blade cam ring 3. The dowel 7b affixed to the left edge of the shutter blade 5b slides inside the cam hole 3b according to the motion of the shutter blade cam ring 3. The interaction between the dowel 7b and the cam hole 3b, causes the shutter blade 5b to rotate according to the motion of the shutter blade cam ring 3 with the dowel 6b as its center.

The aperture blades 8b–8h will now be described with reference to FIGS. 1–4. Only the aperture blade 8b is shown in FIG. 1 in order to simplify the figure; however, a total of seven (7) aperture blades 8b–8h are positioned equiangularly around the optical axis 20 (see FIG. 4). The aperture blade 8b will be described as representative of the other aperture blades 8c–8h. A dowel 9b is affixed to the aperture blade 8b, and the dowel 9b is fitted with the upper plate 1 in a manner which permits the aperture blade 8b to freely rotate.

Further, a dowel 10b is also affixed to the aperture blade 8b, and the dowel 10b is fitted in a cam hole 4b of the aperture cam ring 4. Each of the other aperture blades 8c–8h also include dowels affixed thereto in the same manner as dowels 9b and 10b.

In accordance with the first embodiment of the present invention, the outer diameter of the aperture cam ring 4 is smaller than the inner diameter of the shutter blade cam ring 3. Furthermore, as shown in FIG. 2, the aperture blade 8b and the aperture blades 8c–8h (not shown in the figure) are positioned between the upper plate 1 and the aperture cam ring 4.

The aperture cam ring 4 is fitted with the upper plate 1 in a manner which allows the aperture cam ring 4 to rotate. As shown in FIGS. 1 and 3, the aperture cam ring 4 includes a protrusion 4a which passes through a hole 1b in the upper plate 1 and reaches the drive mechanism system. Further, elongated cam holes 4b–4h are provided in the aperture cam ring 4. Referring to the operation of the aperture blade 8b as representative of the blades 8c–8h, the dowel 10b of the aperture blade 8b slides within the aperture cam hole 4b according to the motion of the aperture cam ring 4. The interaction between the dowel 10b and the aperture cam hole 4b causes the aperture blade 8b to rotate according to the motion of the aperture cam ring 4 with the dowel 9b as its center.

FIG. 3 is a top plane view of the shutter unit showing the drive mechanism system on top of the upper plate 1 in accordance with the first embodiment of the present invention. As shown in FIG. 3, a motor 13 is attached to the upper plate 1 and a gear 14 is attached to the end of the rotational axis of the motor 13. A gear 15 is attached to the upper plate 1 such that the gear 15 is allowed to freely rotate. The gear 15 interlocks with a geared part 11a of the drive ring 11. As shown in FIG. 2, the drive ring 11 is positioned between the aperture ring 12 and the upper plate 1, and the drive ring 11 is fitted with the upper plate 1 such that the drive ring 11 is allowed to freely rotate. The drive ring 11 includes a protrusion 11b formed thereon at a position such that when the drive ring 11 rotates to the left (i.e., counterclockwise), the protrusion 11b contacts the protrusion 3a of the shutter blade cam ring 3. Further, the protrusion 3a of the shutter blade cam ring 3 and the upper plate 1 are connected by an energizing spring 16 which energizes the shutter blade cam ring 3 for right (i.e., clockwise) rotation.

As shown in FIG. 2, the aperture ring 12 is fitted to the upper plate 1 on top of the shutter unit in a manner which allows the aperture ring 12 to freely rotate. As shown in FIG. 3, the drive ring 11 includes a protrusion 11c, and the aperture ring 12 includes a protrusion 12b. The protrusion 11c of the drive ring 11 is positioned to contact the protrusion 12b of the aperture ring 12 when the drive ring 11 is rotated to the right (clockwise). Further, the protrusion 12b of the aperture ring 12 is positioned to contact the protrusion 4a of the aperture ring 4 when the aperture ring 12 rotates to the right. Also, the protrusion 4a of the aperture ring 4 and the upper plate 1 are joined by an energizing spring 17 which energizes the aperture ring 4 for left (counterclockwise) rotation.

The aperture ring 12 includes a ratcheted part 12a which interacts with a ratchet 18 attached to the upper plate 1 such that the ratchet 18 is allowed to rotate freely, and is energized for right (clockwise) rotation by an energizing spring 21. A solenoid 19 is attached to the upper plate 1 and an end of a moveable part of the solenoid 19 is positioned to contact the ratchet 18. When the moveable part of the solenoid 19 does not press against the ratchet 18, the spring 21 causes the ratchet 18 to contact the ratcheted part 12a of the aperture ring 12 to stop the aperture ring 12 from rotating to the left (counterclockwise). When the moveable part of the solenoid 19 presses against the ratchet 18, the aperture ring 12 is allowed to rotate. The above-described construction allows the aperture ring 12 to rotate freely when right (clockwise) rotation is attempted; however, when left (counterclockwise) rotation of the aperture ring 12 is attempted, the ratcheted part 12a of the aperture ring 12 and the ratchet 18 act as a stopping mechanism and the aperture ring 12 will not rotate to the left as long as the moveable part of the solenoid 19 does not press against the ratchet 18.

The operation of the shutter unit in accordance with the first embodiment of the present invention will now be described below. FIG. 3 shows an initial status of the shutter before the shutter is operated. In FIG. 3, when the motor 13 rotates the gear 14 to the right (clockwise), the gear 15 rotates to the left (counterclockwise), and the drive ring 11 is thereby rotated to the right (clockwise). As the drive ring 11 rotates to the right (clockwise), the protrusion 11c of the drive ring 11 contacts the protrusion 12b of the aperture ring 12 causing the aperture ring 12 to rotate to the right (clockwise).

Further, as the aperture ring 12 rotates, the protrusion 12b of the aperture ring 12 contacts the protrusion 4a of the aperture cam ring 4 and, against the resistance of the energizing force of the energizing spring 17, the aperture cam ring 4 is rotated to the right. As a result of the rotation of the aperture cam ring 4 to the right, as shown in FIG. 1, the dowel 10b of the aperture blade 8b slides within the cam hole 4b of the aperture cam ring 4, and the aperture blade 8b rotates with the dowel 9b as its center. The operation of the aperture blades 8c–8h (not shown) is exactly the same as the operation of representative aperture blade 8b.

The above-described operations are controlled by an aperture setting mechanism (not shown) which sets a desired diameter for the aperture. The aperture setting mechanism controls the motor 13 to move the aperture blades until the desired diameter of the aperture opening is reached. The motor 13 is then stopped and the drive mechanism system is also stopped.

When the motor 13 rotates the gear 14 to the left (counterclockwise), as shown in FIG. 3, the drive ring 11 also rotates to the left (counterclockwise). As the drive ring 11 rotates to the left, the energizing force of the energizing spring 17 exerts a force on the aperture cam ring 4 and the aperture ring 12 in the counterclockwise direction. However, at this time, the aperture ring 12 and the aperture cam ring 4 remain stopped because the aperture ring 12 is held stationery by the ratchet 18. When the drive ring 11 returns to the position corresponding to the initial status, shown in FIG. 3, the protrusion 11b of the drive ring 11 comes into contact with the protrusion 3a of the shutter blade cam ring 3. Further, as the motor 13 continues to rotate to the left, the protrusion 11b of the drive ring 11 causes the shutter blade cam ring 3 to rotate to the left (counterclockwise in FIG. 3) against the resistance of the energizing spring 16.

As shown in FIG. 1, when the shutter blade cam ring 3 rotates to the left, the dowel 7b of the shutter blade 5b slides within the cam hole 3b of the shutter blade cam ring 3, and the shutter blade 5b rotates left with the dowel 6b as its center. The counterclockwise rotation of the shutter blade cam ring 3 causes the shutter blades 5b–5e to start to retract from the exposure aperture to begin exposure of film (not shown in the figure).

In accordance with the lens shutter of the first embodiment of the present invention, it is unnecessary for the shutter blades 5b–5e to retract completely from the exposure aperture to expose the film. For example, the shutter blades 5b–5e may be made to retract partially and then operate in the opposite direction while part of the shutter blades remain covering the exposure aperture. Of course, it is also possible to make the shutter blades retract completely from the exposure aperture before the shutter blades are made to move in the opposite direction to cover the exposure aperture. In either case, in order to cover the exposure aperture by making the shutter blades 5b–5e move in the opposite direction, as shown in FIG. 3, the motor 13 is stopped and is moved in the reverse direction (to the right), thereby causing the drive ring 11 to rotate to the right. By rotating the drive ring 11 to the right, the shutter blade cam ring 3 follows the drive ring 11 due to the energy of the spring 16, and also rotates to the right. As the shutter blade cam ring 3 rotates to the right, the shutter blade 5b rotates to the right to close the exposure aperture and return the shutter blades 5b–5e to the initial status shown in FIG. 3. With the return of the shutter blades 5b–5e to the initial status, the exposure of the film is completed.

Next, supply of electrical power to the solenoid 19 begins, and the moveable part of the solenoid 19 contacts the ratchet 18 to rotate the ratchet 18 to the left against the resistance of the spring 21. As the ratchet 18 rotates to the left, the stopping mechanism formed between the ratchet 18 and the ratcheted part 12a of the aperture ring 12 is removed, and the aperture ring 12 and the aperture cam ring 4 rotate left due to the force of the energizing spring 17, returning to the initial position shown in FIG. 3. The aperture blade 8b rotates left due to the left rotation of the aperture cam ring 4 and returns to a position of complete retraction from the exposure aperture. When the supply of power to the solenoid 19 is stopped, the moveable part of the solenoid 19 returns to its original position, the ratchet 18 rotates right due to the energy of the energizing spring 21, and the lens shutter returns to the initial status shown in FIG. 3. In the above-described manner, all components return to the status before photographic operations were begun.

A second embodiment of the present invention will now be described below with reference to FIG. 5 which is a cross-sectional side view of the shutter unit in accordance with the second embodiment of the present invention. Like elements in the first and second embodiments are referred to by like reference numerals, and a detailed description of these like elements will not be provided here. The top view of the shutter unit shown in FIG. 5 is essentially the same as the top views of the shutter unit shown in FIGS. 1 and 3 of the first embodiment.

Figure 5:
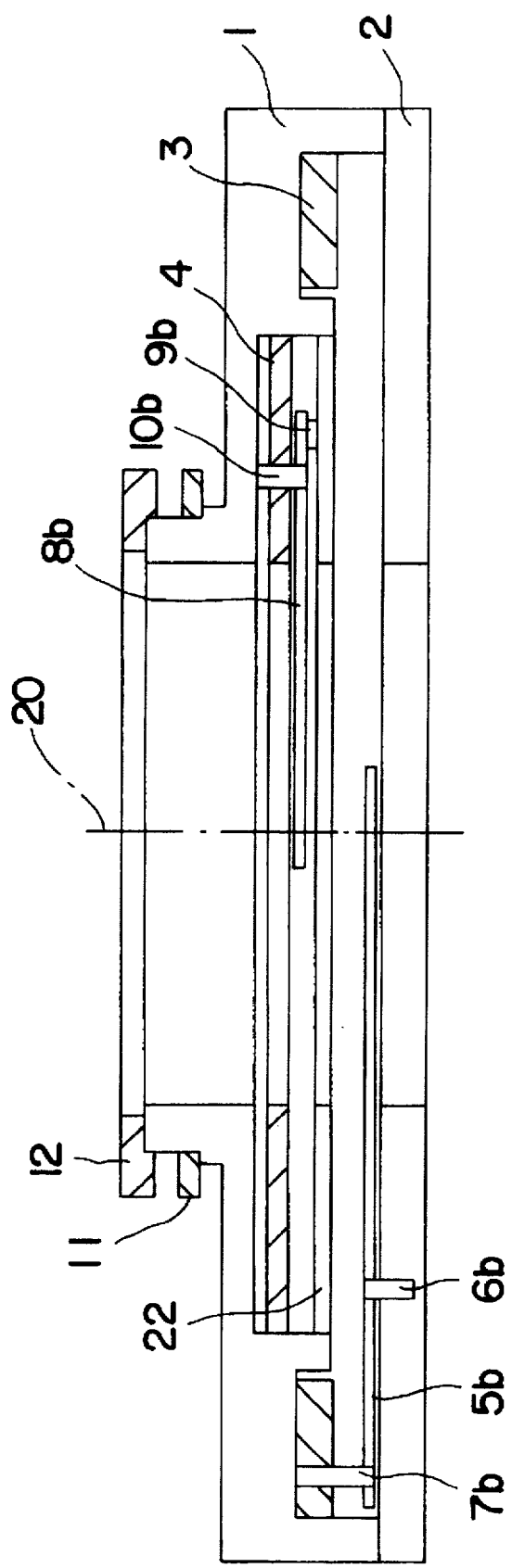
FIG. 5 is a cross-sectional view of a lens shutter in accordance with a second embodiment of the present invention.

In FIG. 5, the shutter blade 5b and the shutter blades 5c–5e (not shown) are positioned between the shutter blade cam ring 3 and the lower plate 2. Further, a circular aperture blade axis support member 22, which is affixed to the upper plate 1, is contained within the circular opening of the shutter blade cam ring 3. Holes are formed in the aperture blade axis support member 22 at equal angular intervals around the optical axis 20. Dowels 9b–9h are fitted to the aperture blades 8b–8h, respectively, to allow the aperture blades to freely rotate, with the dowels 9b–9h as the center of rotation of the aperture blades 8b–8h. The aperture cam ring 4 is fitted to the upper plate 1 in a manner such that the aperture cam ring 4 is freely rotatable, and is positioned between the upper plate 1 and the aperture blades 8b through 8h.

In accordance with the second embodiment of the present invention, the aperture cam ring 4 is not contained within the circular opening of the shutter blade cam ring 3, and at least one part of the aperture blades 8b through 8h and the aperture blade axis support member 22 is contained within the circular opening of the shutter blade cam ring 3. A shutter having the above-described type of construction is also made possible by making the outer diameter of the aperture cam ring 4 smaller than the inner diameter of the shutter blade cam ring 3, thereby achieving a reduction in the size of the outer diameter of the shutter in the optical axis direction.

As described above, the lens shutter in accordance with the first and second embodiments of the present invention includes a first circular cam which drives a first shading member and a second circular cam which drives a second shading member, wherein an inner diameter of one of the cams is larger than an outer diameter of the other cam. The configuration of the shutter unit in accordance with the first embodiment of the present invention makes it possible to achieve a thinner lens shutter unit.

Figure 6:
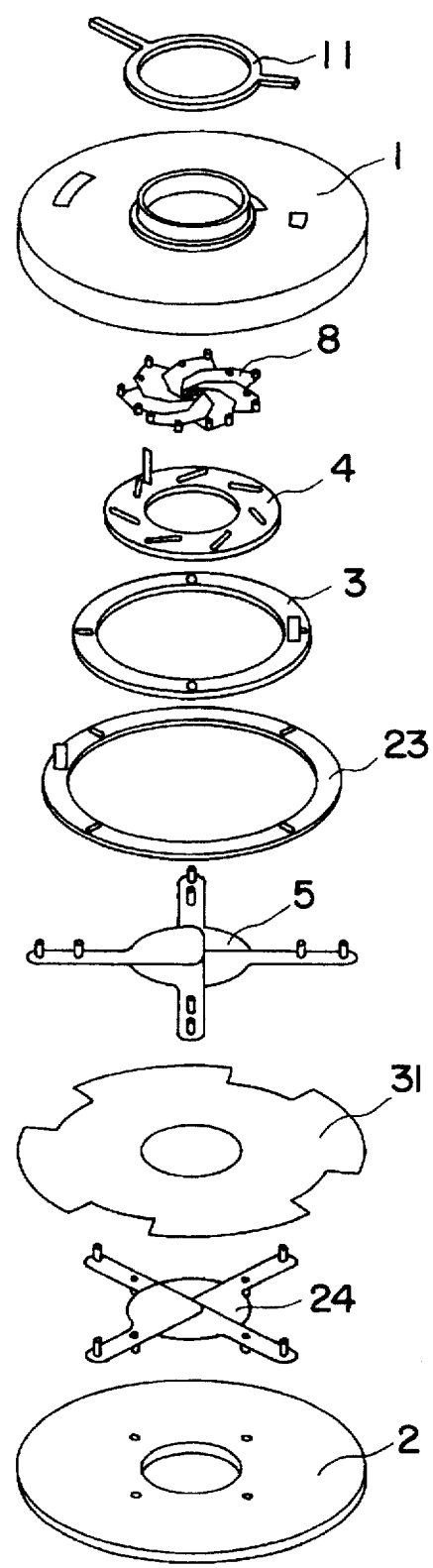
FIG. 6 is an exploded perspective view of a lens shutter in accordance with a third embodiment of the present invention.
Figure 7:
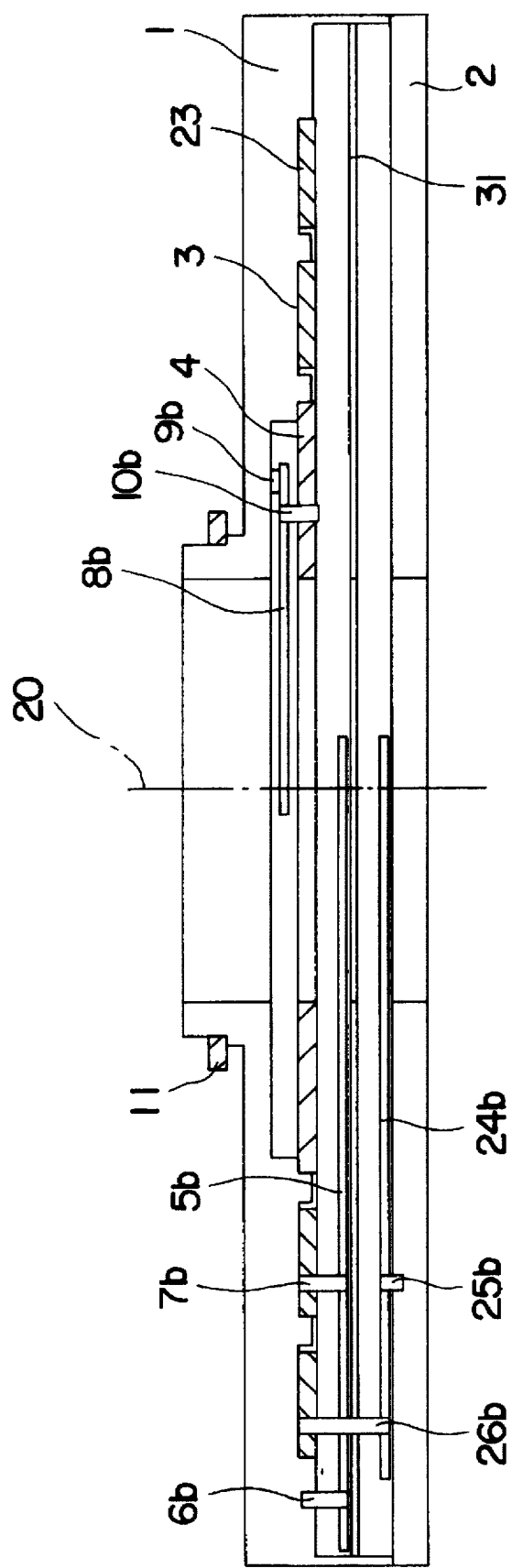
FIG. 7 is a cross-sectional view of a lens shutter in accordance with the third embodiment of the present invention.

A third embodiment of the present invention will be described below with reference to FIGS. 6–9. Like elements in each of the first, second and third embodiments are referred to by like reference numerals. FIG. 6 is an exploded prospective view of a lens shutter unit in accordance with the third embodiment of the present invention, and FIG. 7 is a cross-sectional view of the lens shutter unit in accordance with the third embodiment of the present invention. As shown in FIGS. 6 and 7, the lens shutter in accordance with the third embodiment of the present invention includes opening blades 5, closing blades 24, a middle plate 31 positioned between the opening blades 5 and closing blades 24, aperture blades 8, an opening blade cam ring 3, a closing blade cam ring 23 and an aperture blade cam ring 4 positioned between a circular upper plate 1 and a lower plate 2. A drive mechanism system including a drive ring 11, and other components which will be described in detail with reference to FIG. 9, is positioned on top of the upper plate 1.

Figure 8:
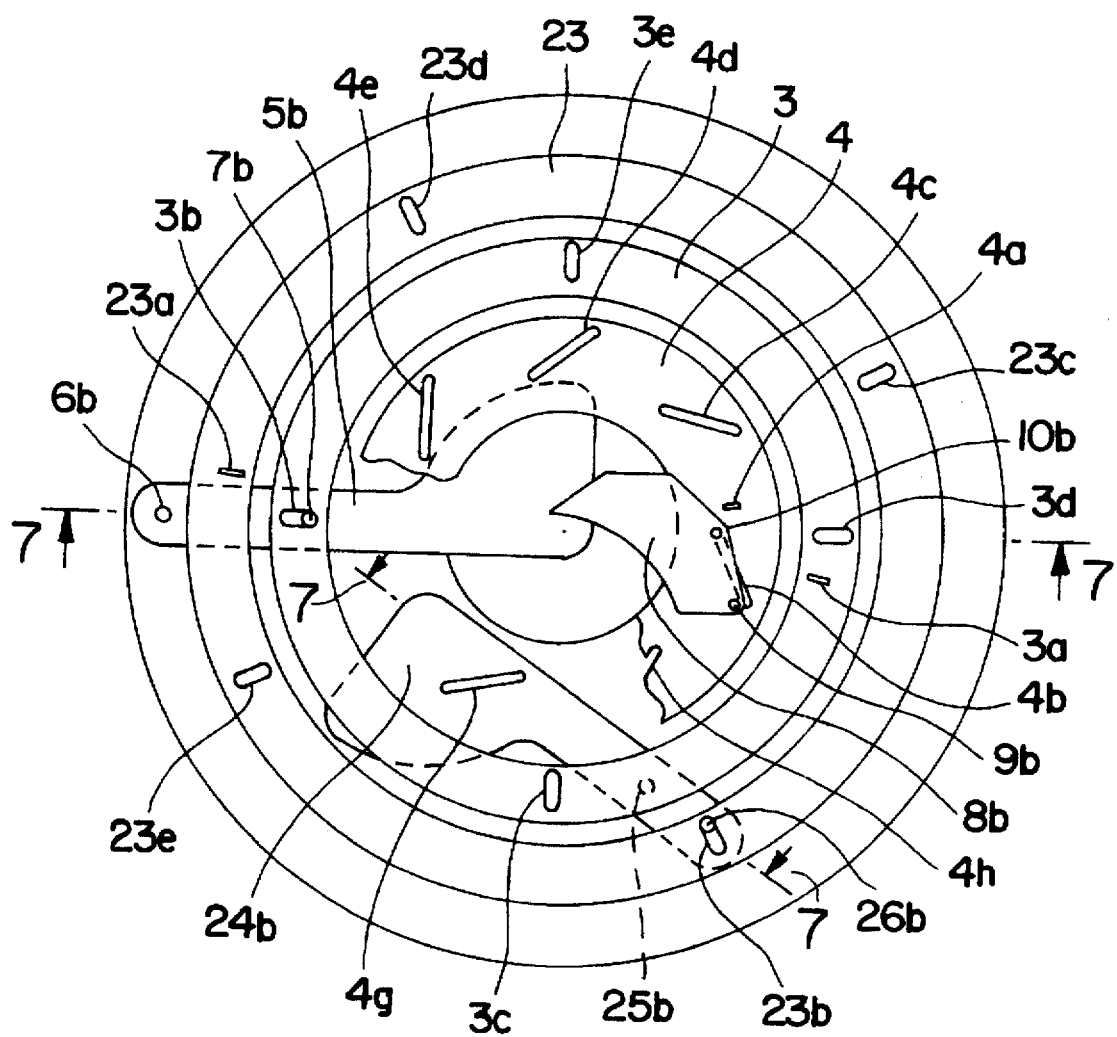
FIG. 8 is a top plane view of a lens shutter in accordance with the third embodiment of the present invention.
Figure 9:
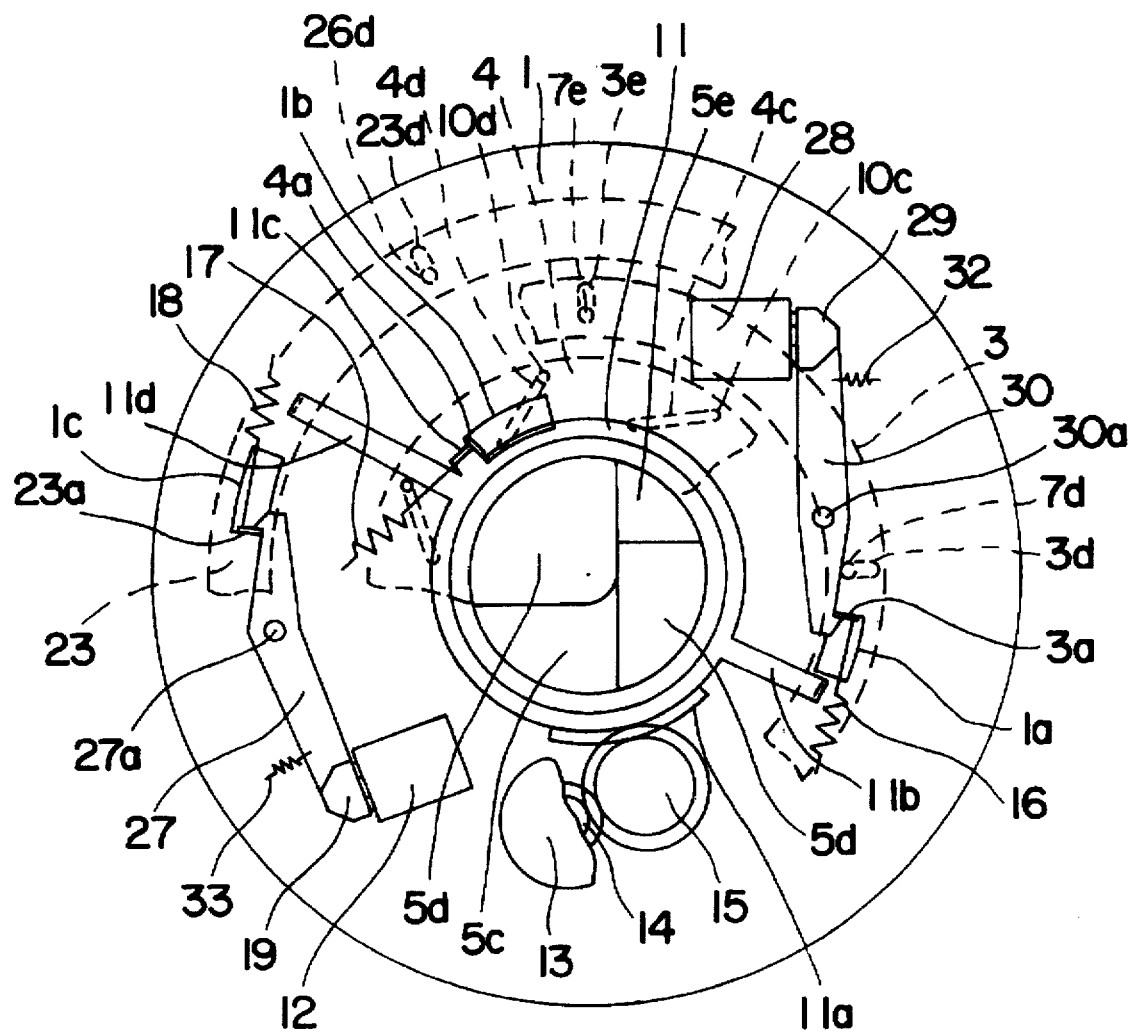
FIG. 9 is a top plane view of a lens shutter in accordance with the third embodiment of the present invention.

FIG. 8 is a top plane view of the shutter unit shown in FIG. 7, without the upper plate 1, the drive mechanism system on top of the upper plate 1, and the middle plate 31. The cross-sectional view of the shutter unit shown in FIG. 7 is taken along the line 7—7 in FIG. 8. However, the drive mechanism system on top of the upper plate 1 is omitted from FIG. 7, except for the drive ring 11. Further, with respect to the closing blade 24 only, FIG. 7 shows a cross-sectional view of the shutter unit shown in FIG. 8 taken along the line 7—7 in FIG. 8. FIG. 9 is a top plane view of the shutter unit shown in FIG. 7 showing the drive mechanism system on top of the upper plate 1.

The lens shutter in accordance with the third embodiment of the present invention includes a total of four opening blades, opening blades 5b, 5c, 5d and 5e. In order to simplify the view in FIG. 8, only opening blade 5b is shown in FIG. 8; however, each of the opening blades 5b–5e operate in the same manner as opening blade 5b. The four (4) opening blades, opening blades 5b–5e, are positioned at points separated by 90° around the optical axis 20. Referring to the opening blade 5b as representative of the other opening blades 5c–5e, a dowel 6b is affixed to the opening blade 5b, and the dowel 6b is fitted with the upper plate 1 in a manner that allows the opening blade 5b to rotate freely. Further, a dowel 7b is affixed to the opening blade 5b, and the dowel 7b is fit in a cam hole 3b of the opening blade cam ring 3. Furthermore, as shown in FIG. 7, the opening blade 5b and the opening blades 5c–5e (not shown in the figure) are positioned between the opening blade cam ring 3 and the middle plate 31 at different heights in the direction of the optical axis 20 so that the opening blades 5b–5e do not interfere with each other when in operation.

The opening blade cam ring 3 is fitted to the upper plate 1 so that the opening blade cam ring 3 can rotate. As shown in FIGS. 8 and 9, the opening blade cam ring 3 includes a protrusion 3a which passes through a hole 1a in the upper plate 1 and reaches the drive mechanism system. Further, elongated cam holes 3b–3e are formed in the opening blade cam ring 3. The dowel 7b affixed to the opening blade 5b slides inside the cam hole 3b according to the motion of the opening blade cam ring 3. As a result of the interaction between the dowel 7b and the cam hole 3b, the opening blade 5b rotates according to the motion of the opening blade cam ring 3 with the dowel 6b as its center.

The closing blades 24b–24e will now be described with reference to FIGS. 6–9. Only the closing blade 24b is shown in FIG. 8 in order to simplify the figure; however, a total of four (4) closing blades 24b–24e are positioned at points separated by 90° around the optical axis 20. The closing blade 24b will be described as representative of the other closing blades 24c–24e. A dowel 25b is affixed to the closing blade 24b, and the dowel 25b is fitted with the lower plate 2 in a manner which permits the closing blade 24b to freely rotate. Further, a dowel 26b is also affixed to the closing blade 24b, and the dowel 26b is fitted in a cam hole 23b of the closing blade can ring 23. As shown in FIG. 7, the closing blade 24b and the closing blades 24c–24e (not shown in the figure) are positioned between the lower plate 2 and the middle plate 31 at different heights in the direction of the optical axis 20 so that the blades 24b–24e do not interfere with each other when in operation.

The closing blade cam ring 23 is fitted with the upper plate 1 in a manner which allows the closing blade cam ring 23 to rotate. As shown in FIGS. 8 and 9, the closing blade cam ring 23 includes a protrusion 23a which passes through a hole 1c in the upper plate 1a and reaches the drive mechanism system. Further, elongated cam holes 23b–23e are formed in the closing blade cam ring 23. Referring to the operation of the closing blade 24b as representative of the closing blades 24c–24e, the dowel 26b of the closing blade 24b slides within the cam hole 23b according to the motion of the closing blade cam ring 23. As a result of the interaction between the dowel 26b and the cam hole 23b, the closing blade 24b rotates according to the motion of the closing blade cam ring 23 with the dowel 26b as its center.

The aperture blades 8b–8h will now be described with reference to FIGS. 6–9. Only the aperture blade 8b is shown in FIGS. 7 and 8; however, a total of seven (7) aperture blades 8b–8h are positioned equiangularly around the optical axis 20. The aperture blade 8b will be described as representative of the other aperture blades 8c–8h. A dowel 9b is affixed to the aperture blade 8b, and the dowel 9b is fitted with the upper plate 1 in a manner which permits the aperture blade 8b to rotate freely. Further, a dowel 10b is also affixed to the aperture blade 8b, and the dowel 10b is fitted in a cam hole 4b of the aperture cam ring 4. Furthermore, as shown in FIG. 7, the aperture blade 8b and aperture blades 8c–8h (not shown in the figure) are positioned between the upper plate 1 and the aperture cam ring 4.

The aperture cam ring 4 is fitted with the upper plate 1 in a manner which allows the aperture cam ring 4 to rotate. As shown in FIGS. 8 and 9, the aperture cam ring 4 includes a protrusion 4a which passes through a hole 1b in the upper plate 1 and reaches the drive mechanism system. Further, elongated cam holes 4b–4h are provided in the aperture cam ring 4. Referring to the operation of the aperture blade 8b as representative of the blades 8c–8h, the dowel 10b of the aperture blade 8b slides within the aperture cam hole 4b according to the motion of the aperture cam ring 4. As a result of the interaction between the dowel 10b and the aperture cam hole 4b, the aperture blade 8b rotates according to the motion of the aperture cam ring 4 with the dowel 9b as its center.

In accordance with the third embodiment of the present invention, the outer diameter of the aperture cam ring 4 is smaller than the inner diameter of the opening blade cam ring 3, and the outer diameter of the opening blade cam ring 3 is smaller than the inner diameter of the closing blade cam ring 23. Accordingly, the aperture cam ring 4, the opening blade cam ring 3, and the closing blade cam ring 23 are positioned within the opening blade unit in a manner such that the respective cam rings form concentric circles on approximately the same plane.

FIG. 9 is a top plane view of the shutter unit showing the drive mechanism system on top of the upper plate 1 in accordance with the third embodiment of the present invention. As shown in FIG. 9, a motor 13 is attached to the upper plate 1 and a gear 14 is attached to the end of the rotational axis of the motor 13. A gear 1 5 is attached to the upper plate 1 such that the gear 15 is allowed to freely rotate. The gear 15 interlocks with a geared part 11a of the drive ring 11. As shown in FIG. 7, the drive ring 11 is fitted with the top of the upper plate 1 in a manner which allows the drive ring 11 to freely rotate. The drive ring 11 includes a protrusion 11b at a position such that when the drive ring 11 rotates to the left (counterclockwise), the protrusion 11b contacts the protrusion 3a of the opening blade cam ring 3. The protrusion 3a of the opening blade cam ring 3 and the upper plate 1 are connected by an energizing spring 16 which energizes the opening blade cam ring 3 for right (clockwise) rotation. Further, a protrusion 11d is formed on the drive ring 11 at a position such that when the drive ring 11 rotates to the left (counterclockwise), the protrusion 11d contacts the protrusion 23a of the closing blade cam ring 23. The protrusion 23a of the closing blade cam ring 23 and the upper plate 1 are connected by an energizing spring which energizes the closing blade cam ring 23 for right (clockwise) rotation.

Another protrusion 11c is formed on the drive ring 11 at a position such that when the drive ring 11 rotates to the right (clockwise), the protrusion 11c contacts the protrusion 4a of the aperture cam ring 4. The protrusion 4a of the aperture cam ring 4 and the upper plate 1 are connected by an energizing spring 17 which energizes the aperture cam ring 4 for left (counterclockwise) rotation.

An electromagnet 28 is attached to the upper plate 1. The electromagnet 28 is a self-adsorption type of electromagnet, and its adsorption power is generated when no electricity is being applied and disappears when a certain voltage is applied. When no electricity is being applied to the electromagnet 28, the electromagnet 28 adsorbs a moveable sheet 29 which has a high degree of magnetic permeability. The moveable sheet 29 is attached to one end of an opening blade armature lever 30, and the opening blade armature lever 30 is attached to the upper plate 1 in a manner which allows the opening blade armature lever 30 to rotate with axis 30a as its center. The end of the opening blade armature lever 30 opposite the end to which the moveable sheet 29 is attached is formed in a hook shape, and acts as a stopping mechanism to stop the protrusion 3a of the opening blade cam ring 3 before opening blade operation. The opening blade armature lever 30 is energized by an energizing spring 32 to rotate right (clockwise) in a direction which releases the stopping mechanism formed by the hook-shaped end of the opening blade armature lever 30. However, the opening blade armature lever 30 remains in a stopped status while the moveable sheet 29 is adsorbed to the electromagnet 28 with a force greater than that exerted by the spring 32.

Another electromagnet 12 is also attached to the upper plate 1. The electromagnet 12 is also a self-adsorption type. When no electricity is being applied to the electromagnet 12, it adsorbs a moveable sheet 19 which has a high degree of magnetic permeability. The moveable sheet 19 is attached to one end of a closing blade armature lever 27, and the closing blade armature lever 27 is attached to the upper plate 1 in a manner which allows the opening blade armature lever to rotate with axis 27a as its center. The end of closing blade armature lever 27 opposite the end to which the moveable sheet 19 is attached is formed in a hook shape, and acts as a stopping mechanism to stop the protrusion 23a of the closing blade cam ring 23 before opening blade operation. The closing blade armature lever 27 is energized by an energizing spring 18 to rotate right (clockwise) in a direction which releases the stopping mechanism formed by the hook-shaped end of the closing blade armature lever 27. However, the closing blade armature lever 27 remains in stopped status while the moveable sheet 19 is adsorbed to the electromagnet 12 with a force greater than that exerted by the spring 33.

The operation of the opening blade unit in accordance with the third embodiment of the present invention will now be described below. FIG. 9 shows an initial status of the opening blade before the opening blade is operated. In FIG. 9, when the motor 13 rotates the gear 14 to the right (clockwise), the gear 15 rotates to the left (counterclockwise), and the drive ring 11 is thereby rotated to the right (clockwise). As the drive ring 11 rotates to the right (clockwise), the protrusion 11c of the drive ring 11 contacts the protrusion 4a of the aperture cam ring 4 causing the aperture cam ring 4 to rotate to the right against the resistance of the energizing spring 17.

As the aperture cam ring 4 rotates to the right, as shown in FIG. 8, the dowel 10b of the aperture blade 8b slides within the cam hole 4b of the aperture cam ring 4, and the aperture blade 8b rotates left with the dowel 9b as its center. The operation of the aperture blades 8c–8h (not shown) is exactly the same as the operation of representative aperture blade 8b.

The above-described operations are controlled by an aperture setting mechanism (not shown) which sets a desired diameter for the aperture. The aperture setting mechanism controls the aperture setting such that when the aperture opening reaches the prescribed diameter, the motor 13 is stopped and the motor 13 maintains the aperture blades 8b–8h at the prescribed aperture opening diameter while the opening blades 5b–5e and the closing blades 24b–24e are in operation. Next, when electricity is supplied to the electromagnet 28 and its adsorption power is lost, the opening blade armature lever 30 rotates to the right as a result of the force of the energizing spring 32. Further, as a result of the rotation of the opening blade armature lever 30 to the right, the hook-shaped end of the opening blade armature lever 30 no longer contacts the protrusion 3a of the opening blade cam ring 3 to stop rotation of the opening blade cam ring 3. Accordingly, the opening blade cam ring 3 rotates to the right due to the energizing force of the energizing spring 16.

As shown in FIG. 8, when the opening blade cam ring 3 rotates to the right, the dowel 7b of the opening blade 5b slides within the cam hole 3b of the opening blade cam ring 3, and the opening blade 5b rotates to the left with the dowel 6b as its center. The opening blades 5c–5e operate in the same manner as the opening blade 5b. Accordingly, as a result of the right rotation of the opening blade cam ring, the opening blades 5b–5e start to retract from the exposure aperture to begin exposure of film (not shown).

Referring again to FIG. 9, when electricity is supplied to the electromagnet 12 and its adsorption power is lost, the closing blade armature lever 27 rotates to the right as a result of the energizing force of the energizing spring 33. As a result of the right rotation of the closing blade armature lever 27, the hook-shaped end of the closing blade armature lever 27 no longer contacts the protrusion 23a of the closing blade cam ring 23, and the closing blade cam ring 23 rotates to the right due to the energizing force of the energizing spring 18.

As shown in FIG. 8, when the closing blade cam ring 23 rotates to the right, the dowel 26b of the closing blade 24b slides within the cam hole 23b of the closing blade cam ring 23, and the closing blade 24b rotates right (clockwise) with the dowel 25b as its center. As a result of the clockwise rotation of the closing blade cam ring 23, the closing blades 24b–24e cover the exposure aperture part and exposure of the film is completed.

In accordance with the shutter unit of the third embodiment of the invention, the closing blades 24b–24e may be made to start to move in the closed direction while part of the opening blades 5b–5e still cover the exposure aperture, not having been completely retracted from the exposure aperture. Of course, it is also possible to make the closing blades 24b–24e move in the closed direction after they have been completely retracted from the exposure aperture.

When the motor 13 rotates the gear 14 to the left (counterclockwise), as shown in FIG. 3, the gear 15 rotates to the right (clockwise) and the drive ring 11 is rotated to the left. The aperture cam ring 4 then rotates to the left following the drive ring 11 due to the energizing force of the energizing spring 17. As shown in FIG. 8, when the aperture cam ring 4 rotates to the left, the dowel 10b slides within the cam hole 4b of the aperture cam ring 4, and the aperture blade 8b rotates with the dowel 9b as its center. In the above-described manner, the drive ring 11 and the aperture cam ring 4 return to positions corresponding to the initial status of the shutter shown in FIG. 9, and the aperture blades 8b–8h return to their initial status completely retracted from the exposure aperture.

If the drive ring 11 is rotated to the left once again, the protrusion 11b of the drive ring 11 contacts the protrusion 3a of the opening blade cam ring 3, and rotates the opening blade cam ring 3 to the left against the resistance of the energizing spring 16. As a result of the rotation of the opening blade cam ring 3 to the left, as shown in FIG. 8, the dowel 7b of the opening blade 5b slides within the cam hole 3b of the opening blade cam ring 3, and the opening blade 5b rotates to the right with the dowel 6b as its center, thereby covering the exposure aperture. The operation of the opening blades 5c–5e (not shown) is exactly the same as the operation of representative opening blade 5b.

Immediately after the opening blades 5b–5e are rotated to cover the exposure aperture, the protrusion 11d of the drive ring 11 contacts the protrusion 23a of the closing blade cam ring 23, and rotates the closing blade cam ring 23 to the left against the resistance of the energizing spring 18. As a result of the rotation of the closing blade cam ring 23 to the left, as shown in FIG. 8, the dowel 26b of the closing blade 24b slides within the cam hole 23b of the closing blade cam ring 23, and closing blade 24b rotates to the left with the dowel 25b as its center to completely retract the closing blade 24b from the exposure aperture part. The closing blades 24c–24e (not shown in the figure) operate in the same manner as the closing blade 24b.

The supply of electrical power to electromagnet 12 is then stopped, thereby providing adsorption power. The hook-shaped end of the closing blade armature lever 27 is rotated to the left and the protrusion 23a of closing blade cam ring 23 is supported and maintained by the closing blade armature lever 27. Moreover, even when the closing blades 24b–24e are operating, the opening blades 5b–5e, which already have covered the exposure aperture, are moved farther in the closed direction. Further, the opening blades 5b–5e are configured in a manner which prevents part of the exposure aperture from opening and allowing light to pass through.

Next, the direction of rotation of the motor 13 is reversed, and the drive ring 11 is rotated to the right. At this time, the opening blades 5b–5e are at a position where there is some overlap of the opening blades 5b–5e (the initial position of FIG. 9). If the supply of the electrical power to electromagnet 28 is stopped, thereby providing adsorption power, the hook-shaped end of the opening blade armature lever 30 rotates to contact the protrusion 3a of the opening blade cam ring 3, thereby supporting and maintaining the position of the opening blade cam ring 3. The drive ring 11 continues to rotate right, and the motor 13 will finally stop at its initial position, as shown in FIG. 9, and the drive ring 11 also stops. At this point, all components have returned back to their initial status prior to photographic operation.

In accordance with the third embodiment of the present invention, a lens shutter unit is provided in which the size of the shutter unit in the direction of the optical axis is made thinner because the outer diameter of the aperture cam ring 4 is smaller than the inner diameter of the opening blade cam ring 3, and the outer diameter of the opening blade cam ring 3 is smaller than the inner diameter of the closing blade cam ring 23, so that the three cam rings can be positioned on a nearly the same plane. However, the relationship between the sizes of the three cams may correspond to five other possible patterns. More specifically, the cams may be configured, from smaller to larger, as follows: a first configuration is aperture cam ring, closing blade cam ring, then opening blade cam ring; a second configuration is opening blade cam ring, closing blade cam ring, then aperture cam ring; the third configuration is opening blade cam ring, aperture cam ring, then closing blade cam ring; the fourth configuration is closing blade cam ring, aperture cam ring, then opening blade cam ring; and the fifth configuration is closing blade cam ring, opening blade cam ring, then aperture cam ring.

As described above, in accordance with the third embodiment of the present invention, it is possible to provide a thinner style shutter unit by having opening blades, closing blades, and aperture blades which are driven by a first circular cam, a second circular cam, and a third circular cam, respectively, and which cams 3, 23 and 4 are arranged in concentric circles in the shutter unit.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A shutter unit, comprising:
   a first shading member to open or close an exposure aperture;
   a first circular cam to drive the first shading member;
   a second shading member to form a plurality aperture of diameters when the exposure aperture is open; and
   a second circular cam to drive the second shading member,
   wherein one of the first circular cam and the second circular cam has an inner diameter which is larger than an outer diameter of the other cam.

2. A shutter unit as recited in claim 1, wherein the first circular cam and the second circular cam are on approximately the same plane.

3. A shutter unit as recited in claim 1, wherein at least a portion of the other cam is within the circumference of the cam having an inner diameter larger than the outer diameter of the other cam.

4. A shutter unit as recited in claim 1, wherein at least a portion of one of the first shading member and the second shading member is within the circumference of the cam having an inner diameter larger than the outer diameter of the other cam.

5. A shutter unit as recited in claim 1, further comprising a support member to support one of the first shading member and the second shading member, wherein at least a portion of the support member is within the circumference of the cam having an inner diameter larger than the outer diameter of the other cam.

6. A shutter unit, comprising:
   a lens shutter having a first shading member to open an exposure aperture;
   a first circular cam to drive the first shading member;
   a second shading member to close the exposure aperture;
   a second circular cam to drive the second shading member;
   a third shading member to form a plurality of aperture opening diameters; and
   a third circular cam to drive the third shading member.

7. A shutter unit as recited in claim 6, wherein the first circular cam, the second circular cam and the third circular cam are on approximately the same plane.

8. A shutter unit as recited in claim 6, wherein the first circular cam has an outer diameter smaller than an inner diameter of the second circular cam,
   and the second circular cam has an outer diameter smaller than an inner diameter of the third circular cam.

9. A shutter unit as recited in claim 6, wherein the first circular cam has an outer diameter smaller than an inner diameter of the third circular cam,
   and the third circular cam has an outer diameter smaller than an inner diameter of the second cam.

10. A shutter unit as recited in claim 6, wherein the second cam has an outer diameter smaller than an inner diameter of the first circular cam,
    and the first cam has an outer diameter smaller than an inner diameter of the third cam.

11. A shutter unit as recited in claim 6, wherein the second circular cam has an outer diameter smaller than an inner diameter of the third circular cam,
    and the third circular cam has an outer diameter smaller than an inner diameter of the first circular cam.

12. A shutter unit as recited in claim 6, wherein the third circular cam has an outer diameter smaller than an inner diameter of the first circular cam,
    and the first circular cam has an outer diameter smaller than an inner diameter of the second circular cam.

13. A shutter unit as recited in claim 6, wherein the third circular cam has an outer diameter smaller than an inner diameter of the second circular cam,
    and the second circular cam has an outer diameter smaller than an inner diameter of the first circular cam.

14. A shutter unit as recited in claim 7, wherein the first circular cam, the second circular cam and the third circular cam form concentric circles.

15. A shutter unit as recited in claim 1, wherein the first shading member comprises a plurality of equiangularly spaced shutter blades, and the second shading member comprises a plurality of equiangularly spaced aperture blades.

16. A shutter unit as recited in claim 15, wherein the first circular cam is a shutter cam to open and close the shutter blades upon rotation of the first circular cam and the second circular cam is an aperture cam to control the aperture diameter by rotation of the second circular cam.

17. A shutter unit as recited in claim 16, wherein the outer diameter of the aperture cam is smaller than the inner diameter of the shutter cam.

18. A shutter unit as recited in claim 6, wherein the first shading member includes shutter opening blades, the second shading member includes shutter closing blades and the third shading member includes aperture blades, and the third circular cam has an outer diameter smaller than an inner diameter of the first circular cam, and the first circular cam has an outer diameter smaller than an inner diameter of the second circular cam.

19. A shutter unit as recited in claim 18, wherein the first circular cam, the second circular cam and the third circular cam are on approximately the same plane.

20. A drive device to drive members for covering an exposure aperture, comprising:

a first member to cover the exposure aperture;

a first circular cam to drive the first member;

a second member to cover the exposure aperture; and a second circular cam to drive the second member;

wherein the first circular cam and the second circular cam are on the same plane.

21. A drive device to drive members for covering an exposure aperture, comprising:

a first member to cover the exposure aperture;

a first circular cam to drive the first member;

a second member to cover the exposure aperture;

a second circular cam to drive the second member, wherein the one of the first circular cam and the second circular cam has an inner diameter which is larger than an outer diameter of the other cam.

22. A drive device as recited in claim 21, further comprising a third circular cam to drive a third member, wherein the first circular cam has an outer diameter smaller than an inner diameter of the second circular cam and the second circular cam has an outer diameter smaller than an inner diameter of the third circular cam.

* * * * *